US006545807B2

(12) United States Patent
Maruyama

(10) Patent No.: US 6,545,807 B2
(45) Date of Patent: Apr. 8, 2003

(54) REFRACTIVE-DIFFRACTIVE HYBRID LENS

(75) Inventor: Koichi Maruyama, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/747,970

(22) Filed: Dec. 27, 2000

(65) Prior Publication Data

US 2001/0055156 A1 Dec. 27, 2001

(30) Foreign Application Priority Data

Dec. 28, 1999 (JP) .......................................... 11-375019

(51) Int. Cl.[7] ................................................ G02B 27/44
(52) U.S. Cl. ........................ 359/565; 359/566; 359/569
(58) Field of Search ............................ 359/16, 19, 565, 359/569, 566, 570

(56) References Cited

U.S. PATENT DOCUMENTS

| | | | | | |
|---|---|---|---|---|---|
| 5,260,828 A | * | 11/1993 | Londono et al. | 359/565 |
| 5,538,674 A | * | 7/1996 | Nisper et al. | 264/1.31 |
| 5,691,847 A | * | 11/1997 | Chen | 359/565 |
| 5,745,289 A | * | 4/1998 | Hamblen | 359/565 |
| 6,088,322 A | | 7/2000 | Broome et al. | 369/112 |
| 6,118,594 A | | 9/2000 | Maruyama | 359/565 |
| 6,191,889 B1 | | 2/2001 | Maruyama | 359/565 |
| 6,262,844 B1 | * | 7/2001 | Soskind | 359/565 |

FOREIGN PATENT DOCUMENTS

| | | | | |
|---|---|---|---|---|
| EP | 0 690 328 A1 * | 1/1996 | 359/565 |
| JP | 11337818 | 12/1999 | |

OTHER PUBLICATIONS

G.P. Behrmann, et al., "Influence of temperature on diffractive lens performance", Applied Optics, vol. 32, No. 14, pp. 2483–2489, May 10, 1993.*

Carmina Londono, et al., "Athermalization of a single–component lens with diffractive optics", Applied Optics, col. 32, No. 13, pp 2295–2301, May 1, 1993.*

* cited by examiner

*Primary Examiner*—John Juba, Jr.
(74) *Attorney, Agent, or Firm*—Greenblum & Bernstein, P.L.C.

(57) ABSTRACT

Disclosed is a refractive-diffractive hybrid lens that includes a refractive lens having at least one aspherical surface, and a diffractive lens structure having a plurality of concentric ring-shaped steps that are formed on at least one lens surface of the refractive lens. The refractive lens and the diffractive lens structure are designed such that a change of the spherical aberration due to a change of the refractive index becomes small. That is, the refractive lens is designed to correct a coma and to reduce the change of the spherical aberration due to the variation of the refractive index, and the diffractive lens structure is designed to correct the residual spherical aberration. The refractive lens is a single biconvex lens, and at least one surface is aspherical. The diffractive lens structure generates a negative spherical aberration to reduce the ratio of a change of the spherical aberration to a variation of the refractive index.

2 Claims, 4 Drawing Sheets

REFRACTIVE-DIFFRACTIVE HYBRID LENS

BACKGROUND OF THE INVENTION

The present invention relates to the refractive-diffractive hybrid lens that has a refractive lens and a diffractive lens structure formed on a lens surface of the refractive lens.

Aberrations of a refractive lens vary as refractive index varies. For an aspherical positive single lens satisfying a sine condition, a focal length shortens and a spherical aberration becomes negative (undercorrected) as a refractive index increases, and the focal length becomes longer and the spherical aberration becomes positive (overcorrected) as the refractive index decreases.

In an optical system of an optical disc apparatus, a change of a focal length of an objective lens due to the change of the refractive index causes no problem because it can be corrected by a focusing mechanism.

However, a change of a spherical aberration causes a problem because a wavefront of a laser beam is disturbed when the spherical aberration is not adequately corrected. If the spherical aberration exceeds an acceptable level, the laser beam can not be converged into the required spot size on an optical disc. In such a case, the optical system can not record or reproduce information data.

The refractive index varies as a temperature changes. In particular, a refractive index of a plastic lens greatly varies as a temperature changes.

Accordingly, the temperature range within which the aberration does not exceed the acceptable level becomes smaller when a plastic lens is employed.

Further, there is a material whose refractive index is not stable during a molding process. Since the refractive index of the material varies depending on a molding condition, the refractive index of the molded lens may be different from the design value of the refractive index, which generates the aberration. Therefore, when the lens is manufactured through the molding process, the lens should not be made from such material.

SUMMARY OF THE INVENTION

It is therefore an object of the present invention to provide a refractive-diffractive hybrid lens that resists a temperature change even when it is made from plastic. A further object of the invention is to allow a lens to be made from the material whose refractive index is not stable during a molding process even when the lens is made through the molding process.

For the above object, according to the present invention, there is provided an improved refractive-diffractive hybrid lens, which includes a refractive lens, and a diffractive lens structure having a plurality of concentric ring-shaped steps that are formed on at least one lens surface of the refractive lens. The refractive lens and the diffractive lens structure are designed such that a change of the spherical aberration due to a change of the refractive index becomes small.

With this construction, the change of the spherical aberration can be reduced even when the refractive index varies due to the temperature change. Further, if the refractive index varies during the molding process, the spherical aberration can be kept small. Therefore, when the lens is used as an objective lens of an optical disc apparatus, a laser beam can be converged into the required spot size on an optical disc in spite of the change of the refractive index.

A converging lens such as an objective lens of an optical disc apparatus should satisfy the following conditions.

(a) A spherical aberration is corrected.

(b) A coma is corrected.

These conditions can be satisfied by employing an aspherical surface. The object of the invention is to satisfy the condition (c) in addition to the conditions (a) and (b). (c) A change of spherical aberration due to a variation of a refractive index is reduced.

The aspherical refractive lens cannot satisfy these conditions (a), (b) and (c) at the same time, while it can satisfy the condition (b) and (c). Thus, in the invention, the refractive lens is designed to satisfy the conditions (b) and (c) and the diffractive lens structure is designed to correct the residual spherical aberration, i.e., to satisfy the condition (a). Since the correction effect of the diffractive lens structure does not vary with the refractive index, the spherical aberration of the refractive-diffractive hybrid lens of the invention can be kept small even when the refractive index varies.

The refractive lens may comprise a single lens. When at least one surface of the single lens is an aspherical surface, it is preferable that the positive spherical aberration caused by the refractive lens is counterbalanced with the negative spherical aberration caused by the diffractive lens structure.

An additional optical path length added by the ring-shaped steps of the diffractive lens structure is expressed by an optical path difference function $\Phi(h)$ as follows:

$$\Phi(h)=(P_2h^2+P_4h^4+P_6h^6+\ldots)\times m\times\lambda$$

where $P_2$, $P_4$ and $P_6$ are coefficients of second, forth and sixth orders, h is a height from the optical axis, m is a diffraction order and $\lambda$ is a working wavelength.

It is preferable that the diffractive lens structure satisfies the following condition (1);

$$-0.20<P_4\times m\times\lambda\times(h_{MAX}/NA)^3<-0.04 \qquad (1)$$

where NA is a numerical aperture, and $h_{MAX}$ is a height from the optical axis of a point where the light ray defining the NA intersects the diffractive lens structure.

DESCRIPTION OF THE ACCOMPANYING DRAWINGS

DESCRIPTION OF THE EMBODIMENTS

Figures 1A, 1B, 1C:
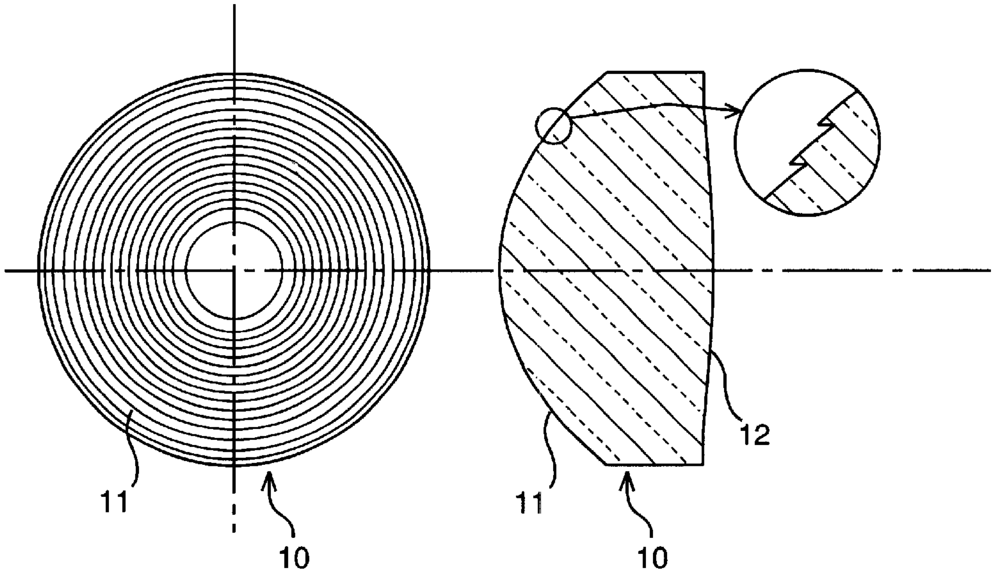
FIG. 1A is a front view of a refractive-diffractive hybrid lens embodying the invention.
FIG. 1B is a vertical cross-sectional view of the refractive-diffractive hybrid lens of FIG. 1A.
FIG. 1C is an enlarged view of FIG. 1B.

FIGS. 1A, 1B and 1C show a refractive-diffractive hybrid lens 10 embodying the invention: FIG. 1A is a front view;

FIG. 1B is a vertical cross-sectional view; and FIG. 1C is an enlarged view of FIG. 1B.

The refractive-diffractive hybrid lens 10 is a biconvex plastic lens having first and second surfaces 11 and 12. A diffractive lens structure is formed on the first surface 11 of the refractive-diffractive hybrid lens 10 as shown in FIG. 1A. At least one of the surfaces 11 and 12 is an aspherical surface, and the surfaces 11 and 12 are designed such that a spherical aberration becomes positive (overcorrected) as a refractive lens only.

The diffractive lens structure is formed, similar to a Fresnel lens, as a large number of concentric ring-shaped steps each of which has a wedge sectional shape as shown in FIG. 1C. The diffractive lens structure gives a predetermined optical path difference at each of the boundaries between the adjacent ring-shaped steps and generate a negative (undercorrected) spherical aberration. The diffractive lens structure is designed such that a spherical aberration of the entire lens does not change even if the refractive index varies. The second surface 12 is formed as a continuous surface without steps.

An additional optical path length added by a diffractive lens structure formed on the first surface 11 of the refractive-diffractive hybrid lens 10 is expressed by the following optical path difference function Φ(h):

$$\Phi(h)=(P_2h^2+P_4h^4+P_6h^6+\ldots)\times m\times\lambda$$

where $P_2$, $P_4$ and $P_6$ are coefficients of second, fourth and sixth orders, h is a height from the optical axis, m is a diffraction order and λ is a wavelength of an incident light beam. The function Φ(h) represents an optical path difference between an imaginary ray that is assumed not to be diffracted by the diffracting lens structure and a ray that is diffracted by the diffractive lens structure, at a point on the diffractive lens structure where the height from the optical axis is h. In such an expression, a negative value of the second order coefficient $P_2$ represents a positive paraxial power of the diffractive lens structure. Further, the positive power increases with the distance from the optical axis, which presents an undercorrected spherical aberration, when the fourth order coefficient $P_4$ is smaller than zero.

An actual microscopic shape of the diffractive lens structure is defined by subtracting λ×m (m:integer) from Φ(h) to have the stepwise additional optical path length as with the Fresnel lens. The width of the ring-shaped step is determined such that the difference between the optical path difference function Φ(h) at the inner edge of the ring-shaped step and that at the outer edge of the same step equals one wavelength. Further, the distance in the optical axis direction between the adjacent ring-shaped steps at the boundary thereof is determined such that the optical path difference between the light ray passing through the one ring-shaped step and the light ray passing through the other ring-shaped step becomes equal to one wavelength.

The refractive-diffractive hybrid lens 10 embodying the invention satisfies the following condition (1);

$$-0.20<P_4\times m\times\lambda\times(h_{MAX}/NA)^3<-0.04 \quad (1)$$

where NA is a numerical aperture, and $h_{MAX}$ is a height from the optical axis of a point where the highest light ray defining the NA intersects the diffractive lens structure.

When the aspherical surface of the refractive lens is designed to have a positive spherical aberration and the diffractive lens structure satisfies the condition (1), a change of the spherical aberration due to a change of the refractive index can be small.

While the diffractive lens structure is formed on the first surface 11 of the refractive-diffractive hybrid lens 10 in the above described embodiment, the diffractive lens structure may be formed on the second surface 12 or on both surfaces 11 and 12. When the diffractive lens structures are formed on both of the surfaces, the coefficient $P_4$ in the condition (1) will be defined as the sum of the coefficients $P_4$ of the optical path difference functions of both surfaces.

Further, the condition (1) defines the range of the forth order coefficient $P_4$ on the precondition that the optical path difference is approximated with a sixth-order polynomial. Even if the forth coefficient $P_4$ does not satisfy the condition (1) when an optical path difference is approximated with a higher order polynomial, if $P_4$ satisfies the condition (1) when the optical path difference is re-approximated with a sixth-order polynomial, the diffractive lens structure defined by the optical path difference is included in the scope of the invention.

Four embodiments according to the above mentioned construction will be described hereinafter.

First Embodiment

Figure 2:
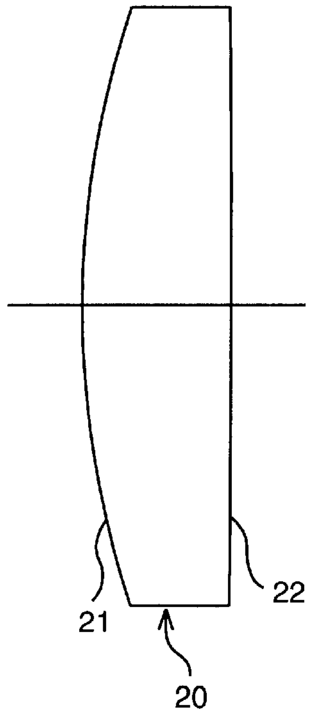
FIG. 2 is a lens diagram showing a refractive-diffractive hybrid lens of a first embodiment.

FIG. 2 shows a refractive-diffractive hybrid lens 20 of the first embodiment. The numerical constructions of the first embodiment are described in TABLE 1. The diffractive lens structure is formed on a first surface 21 of the refractive-diffractive hybrid lens 20 according to the first embodiment. A base curve, which is the shape of the surface of the refractive lens when the diffractive lens structure is not formed, of the first surface 21 is a rotationally-symmetrical aspherical surface. A second surface 22 of the lens 20 is a spherical surface that is almost flat and does not have a diffractive lens structure. The refractive-diffractive hybrid lens 20 is designed such that the spherical aberration does not change even when the refractive index varies.

A rotationally-symmetrical aspherical surface is expressed by the following equation:

$$X(h)=\frac{h^2c}{1+\sqrt{1-(1+K)h^2c^2}}+A_4h^4+A_6h^6+A_8h^8+A_{10}h^{10}+A_{12}h^{12}$$

X(h) is a sag, that is, a distance of a curve from a tangential plane at a point on the surface where the height from the optical axis is h. Symbol c is a curvature (1/r) of the vertex of the surface, K is a conic constant, $A_4$, $A_6$, $A_8$, $A_{10}$ and $A_{12}$ are aspherical surface coefficients of fourth, sixth, eighth, tenth and twelfth orders, respectively.

TABLE 1 shows a paraxial radius of curvature of the first surface 21, various coefficients that define the base curve and the diffractive lens structure of the first surface, a radius of curvature of the second surface 22, a distance d (unit:mm) between the surfaces, a refractive index at the working wavelength, and a back focus fb (unit:mm). In TABLE 1, NA denotes numerical aperture, f (unit:mm) denotes the focal length, λ (unit:nm) denotes the wavelength, and m denotes a diffraction order.

TABLE 1 f = 100 NA = 0.20 λ = 587.56

| | First surface | Second surface |
|---|---|---|
| r | 61.600 | −2169.375 |
| κ | −0.9303 | — |
| A4 | 0.0 | — |
| A6 | $-6.3000 \times 10^{-12}$ | — |
| A8 | $-9.8000 \times 10^{-16}$ | — |
| A10 | 0.0 | — |
| A12 | 0.0 | — |
| P2 | 0.0 | — |

TABLE 1-continued

| | f = 100 NA = 0.20 λ = 587.56 | |
|---|---|---|
| | First surface | Second surface |
| P4 | $-1.6000 \times 10^{-4}$ | — |
| P6 | 0.0 | — |
| P8 | 0.0 | — |
| P10 | 0.0 | — |
| d | 10.000 | |
| n | 1.6000 | |
| $h_{MAX}$ | 20.000 | |
| fb | 93.912 | |
| m | 1 | |

In the first embodiment, a value of the intermediate term of the condition (1) is found as follows:

$$P_4 \times m \times \lambda \times (h_{MAX}/NA)^3 = -1.6000 \times 10^{-4} \times 1 \times 0.00058756 \times (20/0.2)^3 = -0.09401$$

Therefore, the first embodiment satisfies the condition (1).

TABLE 2 shows the change of the spherical aberration due to the variation of the refractive index according to the first embodiment. Each cell of TABLE 2 shows the distance from the each paraxial focal point to the intersection of the optical axis and the light ray whose height on an entrance pupil is hi at the refractive index n. Symbol PFS is a paraxial focal point shift that is the shift of the paraxial focal point at each refractive index from the paraxial focal point at the standard refractive index.

As described above, the shift of the paraxial focal point causes no problem in an optical system of an optical disc apparatus because it is corrected by a focusing mechanism. Thus, the spherical aberration and the paraxial focal point shift are separately described.

TABLE 2

| hi | n = 1.600 | n = 1.575 | n = 1.550 | n = 1.625 | n = 1.650 |
|---|---|---|---|---|---|
| 20.0000 | 0.0000 | −0.0016 | −0.0202 | −0.0127 | −0.0374 |
| 18.0000 | 0.0000 | −0.0026 | −0.0191 | −0.0090 | −0.0279 |
| 16.0000 | 0.0000 | −0.0030 | −0.0170 | −0.0062 | −0.0203 |
| 14.0000 | 0.0000 | −0.0029 | −0.0144 | −0.0042 | −0.0144 |
| 12.0000 | 0.0000 | −0.0025 | −0.0114 | −0.0027 | −0.0098 |
| 10.0000 | 0.0000 | −0.0020 | −0.0084 | −0.0016 | −0.0064 |
| 8.0000 | 0.0000 | −0.0014 | −0.0056 | −0.0009 | −0.0038 |
| 6.0000 | 0.0000 | −0.0008 | −0.0033 | −0.0004 | −0.0021 |
| 4.0000 | 0.0000 | −0.0004 | −0.0015 | −0.0002 | −0.0009 |
| 2.0000 | 0.0000 | −0.0001 | −0.0004 | 0.0000 | −0.0002 |
| 0.0000 | 0.0000 | 0.0000 | 0.0000 | 0.0000 | 0.0000 |
| PFS | 0.0000 | 4.2468 | 8.8852 | −3.9025 | −7.5005 |

As shown in TABLE 2, the spherical aberration is perfectly corrected at the standard refractive index of 1.600. While the variation of the refractive index n causes the shift of the paraxial focal point, the spherical aberration can be kept small.

TABLE 3 shows lens data of a comparative example that has similar to the first embodiment in the focal length, the numerical aperture, the working wavelength and so on. The difference of the comparative example from the first embodiment is that the comparative example does not have the diffractive lens structure and the spherical aberration at the working wavelength is corrected by the aspherical surface.

TABLE 3

| | f = 100 NA = 0.20 λ = 587.56 | |
|---|---|---|
| | First surface | Second surface |
| r | 61.600 | −2169.375 |
| κ | −0.637332 | — |
| A4 | 0.0 | — |
| A6 | $-7.4400 \times 10^{-12}$ | — |
| A8 | $-1.1800 \times 10^{-15}$ | — |
| A10 | 0.0 | — |
| A12 | 0.0 | — |
| d | 10.000 | |
| $h_{MAX}$ | 20.000 | |
| n | 1.6000 | |
| fb | 93.912 | |

TABLE 4 shows the change of the spherical aberration and the paraxial focal point shift due to the variation of the refractive index according to the compared example in the same manner as TABLE 2.

TABLE 4

| hi | n = 1.600 | n = 1.575 | n = 1.550 | n = 1.625 | n = 1.650 |
|---|---|---|---|---|---|
| 20.0000 | 0.0000 | 0.0641 | 0.1231 | −0.0684 | −0.1407 |
| 18.0000 | 0.0000 | 0.0510 | 0.0978 | −0.0545 | −0.1120 |
| 16.0000 | 0.0000 | 0.0396 | 0.0759 | −0.0423 | −0.0871 |
| 14.0000 | 0.0000 | 0.0299 | 0.0572 | −0.0320 | −0.0658 |
| 12.0000 | 0.0000 | 0.0217 | 0.0415 | −0.0232 | −0.0478 |
| 10.0000 | 0.0000 | 0.0149 | 0.0285 | −0.0159 | −0.0328 |
| 8.0000 | 0.0000 | 0.0095 | 0.0181 | −0.0101 | −0.0208 |
| 6.0000 | 0.0000 | 0.0053 | 0.0101 | −0.0056 | −0.0116 |
| 4.0000 | 0.0000 | 0.0024 | 0.0045 | −0.0025 | −0.0051 |
| 2.0000 | 0.0000 | 0.0006 | 0.0011 | −0.0006 | −0.0013 |
| 0.0000 | 0.0000 | 0.0000 | 0.0000 | 0.0000 | 0.0000 |
| PFS | 0.0000 | 4.2468 | 8.8852 | −3.9025 | −7.5005 |

As shown in TABLE 4, the spherical aberration is perfectly corrected at the standard refractive index of 1.600. However, the variation of the refractive index n cause not only the shift the paraxial focal point but also enlargement of the spherical aberration.

Figure 3:
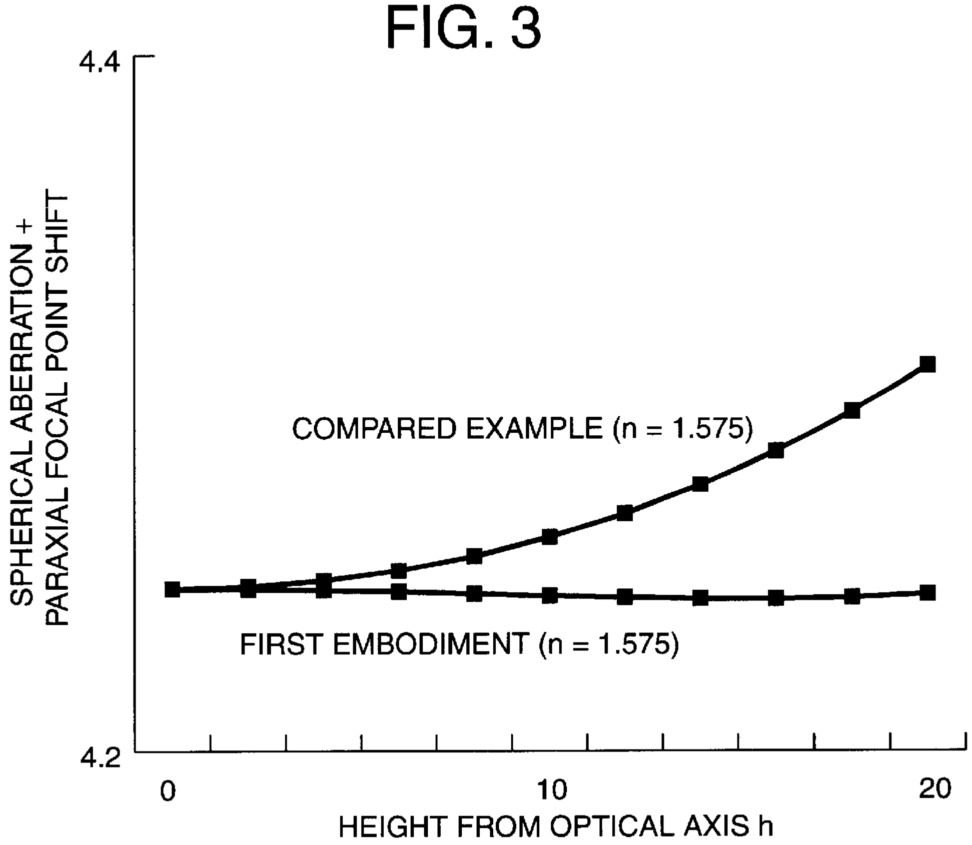
FIG. 3 is a graph showing spherical aberration of the lens according to the first embodiment and that of a compared example at a refractive index of 1.57.
Figure 4:
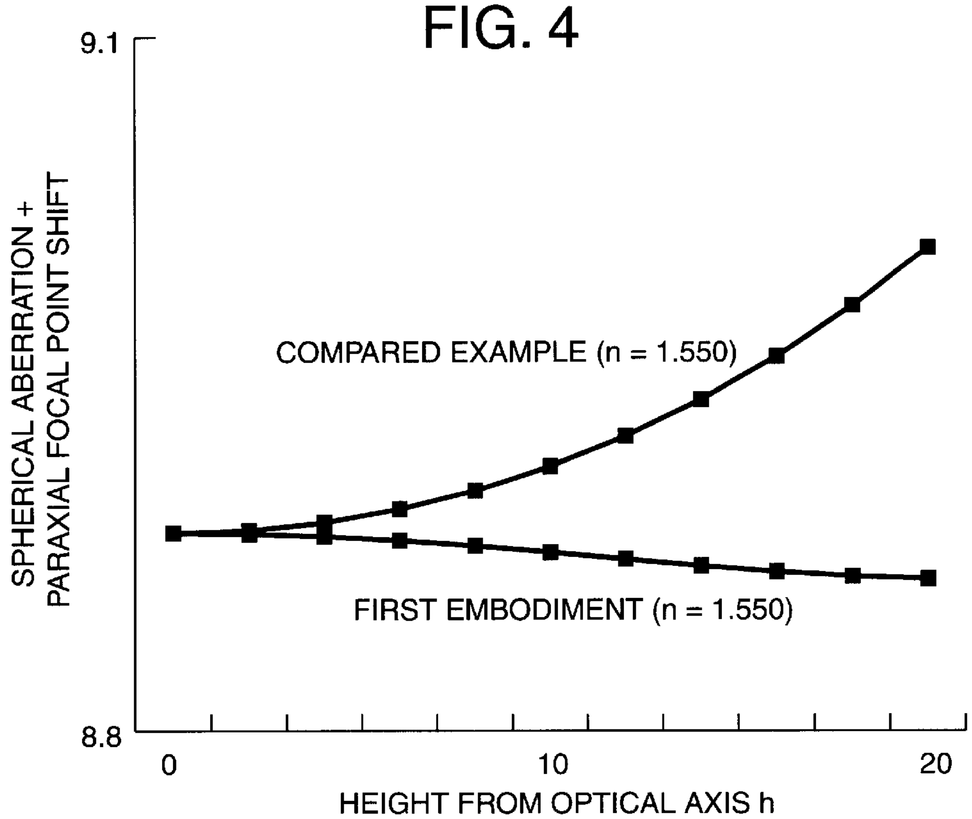
FIG. 4 is a graph showing spherical aberration of the lens according to the first embodiment and that of a compared example at a refractive index of 1.55.

FIGS. 3 and 4 are graphs showing the aberration that contains the spherical aberration and the paraxial focal point shift of the lens 20 according to the first embodiment and that of a comparative example at refractive index of 1.57 and 1.55, respectively. These graphs make it clear that the lens 20 of the first embodiment does not disturb the wavefront and the lens of the comparative example disturbs the wavefront when the refractive index becomes different from the standard refractive index.

Second Embodiment

Figure 5:
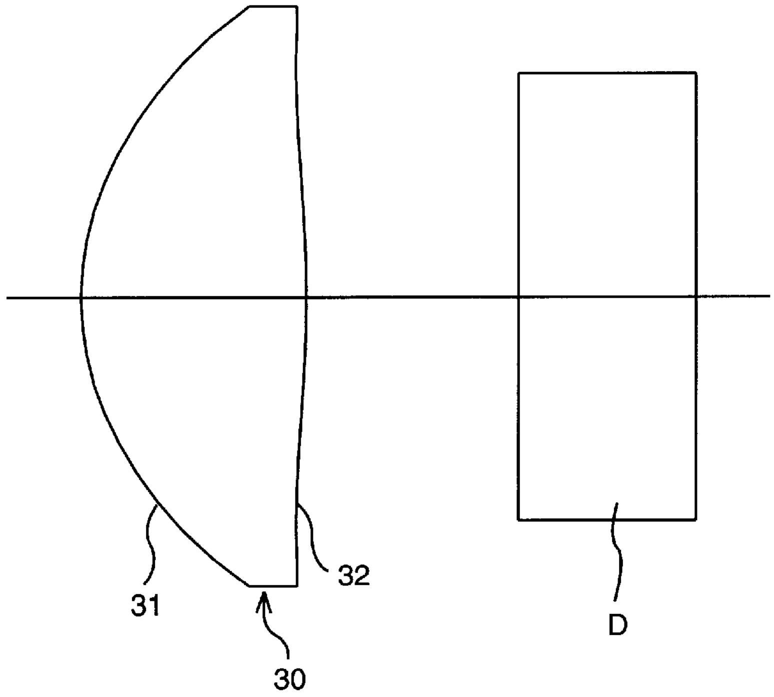
FIG. 5 is a lens diagram showing a refractive-diffractive hybrid lens of a second embodiment with an optical disc.

FIG. 5 shows a refractive-diffractive hybrid lens 30 of the second embodiment. The refractive-diffractive hybrid lens 30 is an objective lens of an optical disc apparatus, and it converges a parallel incident beam onto an information layer of an optical disc through a cover layer D thereof. The spherical aberration at the standard refractive index is corrected as a system including the lens 30 and the cover layer D, and the change of the spherical aberration due to the variation of the refractive index is reduced. The variation of the refractive index of the cover layer D of the optical disc has a small impact on the spherical aberration as compared with that of the lens 30.

The numerical constructions of the second embodiment are described in TABLE 5. The surface numbers 1 and 2 represent the lens 30, and the surface numbers 3 and 4 represent the cover layer D of the optical disc. In TABLE 5, r (unit:mm) denotes a radius of curvature, d (unit:mm) denotes a distance between the surfaces and n denotes a refractive index at the working wavelength. The diffractive lens structure is formed on the second surface 32, and the first surface is a continuous surface without steps. The first surface 31 and the base curve of the second surface 32 of the lens 30 are aspherical surfaces. TABLE 6 shows the aspherical coefficients of the first surface 31 and the base curve of the second surface 32, and the coefficients defining the diffractive lens structure.

TABLE 5 f = 3.00 mm NA 0.65 λ = 650.0 nm

| Surface number | r | d | N |
|---|---|---|---|
| 1 | 1.950 | 1.520 | 1.54082 |
| 2 | −7.022 | 1.420 | |
| 3 | ∞ | 1.200 | 1.58000 |
| 4 | ∞ | | |

TABLE 6

| First surface | Second surface | |
|---|---|---|
| κ = −0.5000 | κ = 0.0 | P2 = 0.0 |
| A4 = $-3.37384 \times 10^{-4}$ | A4 = $2.71844 \times 10^{-2}$ | P4 = $-1.09231 \times 10$ |
| A6 = $-3.63454 \times 10^{-4}$ | A6 = $-6.27195 \times 10^{-3}$ | P6 = 1.06426 |
| A8 = $1.08435 \times 10^{-4}$ | A8 = $1.16588 \times 10^{-3}$ | P8 = 0.0 |
| A10 = $-9.79109 \times 10^{-5}$ | A10 = $-6.61280 \times 10^{-5}$ | P10 = 0.0 |
| A12 = $2.29104 \times 10^{-5}$ | A12 = $-4.00825 \times 10^{-6}$ | m = 1 $h_{MAX}$ = 1.8096 |

In the second embodiment, a value of the intermediate term condition (1) is found as follows:

$$P_4 \times m \times \lambda \times (h_{max}/NA)^3 = -1.09231 \times 10 \times 1 \times 0.000650 \times (1.8096/0.65)^3 = -0.1532$$

Therefore, the second embodiment satisfies the condition (1).

TABLE 7 shows the change of the spherical aberration and the paraxial focal point shift due to the variation of the refractive index according to the second embodiment in the same manner as TABLE 2.

TABLE 7

| hi | n = 1.54082 | n = 1.53882 | n = 1.53982 | n = 1.54182 | n = 1.54282 |
|---|---|---|---|---|---|
| 1.9500 | 0.0000 | −0.0001 | −0.0001 | 0.0000 | 0.0002 |
| 1.7550 | 0.0001 | 0.0001 | 0.0000 | 0.0000 | 0.0001 |
| 1.5600 | 0.0001 | 0.0001 | 0.0001 | 0.0001 | 0.0002 |
| 1.3650 | 0.0001 | 0.0001 | 0.0000 | 0.0000 | 0.0001 |
| 1.1700 | 0.0000 | 0.0001 | 0.0000 | 0.0000 | 0.0001 |
| 0.9750 | 0.0001 | 0.0002 | 0.0001 | 0.0000 | 0.0001 |
| 0.7800 | 0.0001 | 0.0002 | 0.0001 | 0.0000 | 0.0001 |
| 0.5850 | 0.0000 | 0.0001 | 0.0000 | −0.0001 | 0.0000 |
| 0.3900 | −0.0001 | 0.0000 | −0.0001 | −0.0001 | 0.0000 |
| 0.1950 | 0.0000 | 0.0000 | −0.0001 | −0.0001 | 0.0000 |
| 0.0000 | 0.0000 | 0.0000 | 0.0000 | 0.0000 | 0.0000 |
| PFS | 0.0000 | 0.0097 | 0.0049 | −0.0048 | −0.0097 |

As shown in TABLE 7, the spherical aberration is corrected at the standard refractive index of 1.54082. While the variation of the refractive index n causes the shift of the paraxial focal point, the spherical aberration can be kept small.

Third Embodiment

Figure 6:
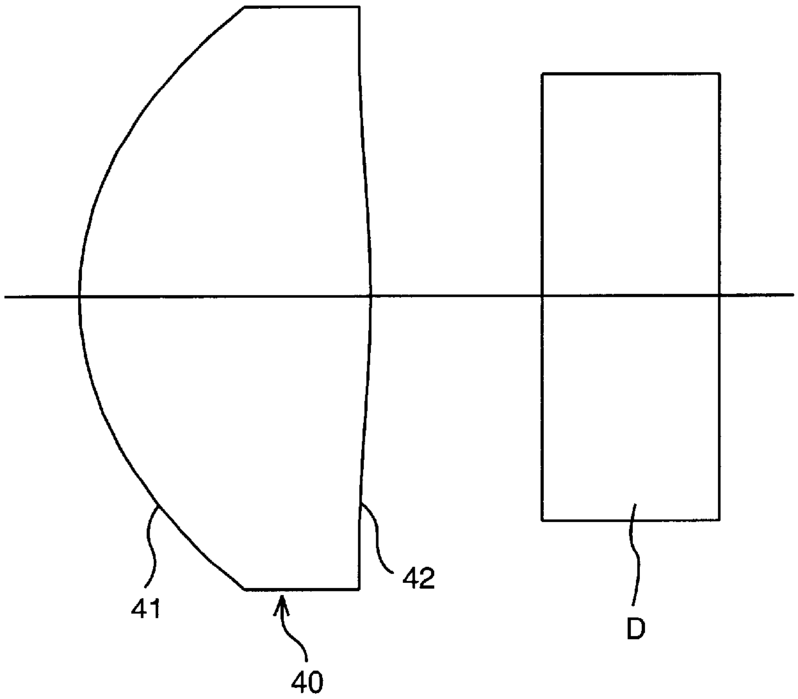
FIG. 6 is a lens diagram showing a refractive-diffractive hybrid lens of a third embodiment with an optical disc.

FIG. 6 shows a refractive-diffractive hybrid lens 40 of the third embodiment. The refractive-diffractive hybrid lens 40 is an objective lens of an optical disc apparatus, and it converges a parallel incident beam onto an information layer of an optical disc through a cover layer D thereof. The spherical aberration at the standard refractive index is corrected as a system including the lens 40 and the cover layer D, and the variation of the spherical aberration due to the change of the refractive index is reduced.

The numerical constructions of the third embodiment are described in TABLE 8. The surface numbers 1 and 2 represent the lens 40, and the surface numbers 3 and 4 represent the cover layer D of the optical disc. The diffractive lens structure is formed on the first surface 41 and the second surface 42 is a continuous surface without steps. The base curve of the first surface 41 and the second surface 42 of the lens 40 are aspherical surfaces. TABLE 9 shows the aspherical coefficients of the base curve of the first surface 41 and the second surface 42, and the coefficients defining the diffractive lens structure.

TABLE 8 f = 3.00 mm NA 0.65 λ = 650.0 nm

| Surface number | r | d | N |
|---|---|---|---|
| 1 | 1.896 | 1.964 | 1.54082 |
| 2 | −7.154 | 1.150 | |
| 3 | ∞ | 1.200 | 1.58000 |
| 4 | ∞ | | |

TABLE 9

| First surface | | Second surface |
|---|---|---|
| κ = −0.5000 | P2 = 0.0 | κ = 0.0000 |
| A4 = $-2.59771 \times 10^{-3}$ | P4 = −3.28146 | A4 = $2.56805 \times 10^{-2}$ |
| A6 = $-6.11913 \times 10^{-4}$ | P6 = $-6.09465 \times 10^{-1}$ | A6 = $-6.24705 \times 10^{-3}$ |
| A8 = $-2.75999 \times 10^{-5}$ | P8 = 0.0 | A8 = $1.37772 \times 10^{-3}$ |
| A10 = $-1.20000 \times 10^{-5}$ | P10 = 0.0 | A10 = $-1.46118 \times 10^{-4}$ |
| A12 = $3.09023 \times 10^{-6}$ | m = 1 $h_{MAX}$ = 1.9500 | A12 = $2.52022 \times 10^{-6}$ |

In the third embodiment, a value of the intermediate term of the condition (1) is found as follows:

$$P_4 \times m \times \lambda \times (h_{max}/NA)^3 = -3.28146 \times 1 \times 0.000650 \times (1.95/0.65)^3 = -0.05759$$

Therefore, the third embodiment satisfies the condition (1).

TABLE 10 shows the change of the spherical aberration due to the variation of the refractive index according to the third embodiment in the same manner as TABLE 2.

TABLE 10

| hi | n = 1.54082 | n = 1.53882 | n = 1.53982 | n = 1.54182 | n = 1.54282 |
|---|---|---|---|---|---|
| 1.9500 | −0.0001 | −0.0004 | −0.0003 | 0.0000 | 0.0002 |
| 1.7550 | −0.0001 | −0.0003 | −0.0003 | −0.0001 | 0.0001 |
| 1.5600 | 0.0000 | −0.0001 | −0.0001 | 0.0000 | 0.0002 |
| 1.3650 | 0.0000 | 0.0000 | −0.0001 | 0.0000 | 0.0001 |
| 1.1700 | −0.0001 | −0.0001 | −0.0001 | −0.0001 | 0.0000 |
| 0.9750 | −0.0001 | 0.0000 | −0.0001 | −0.0001 | 0.0000 |
| 0.7800 | 0.0000 | 0.0000 | 0.0000 | 0.0000 | 0.0000 |
| 0.5850 | 0.0001 | 0.0001 | 0.0000 | 0.0000 | 0.0001 |
| 0.3900 | 0.0000 | 0.0001 | 0.0000 | 0.0000 | 0.0001 |
| 0.1950 | 0.0000 | 0.0001 | 0.0000 | 0.0000 | 0.0001 |
| 0.0000 | 0.0000 | 0.0000 | 0.0000 | 0.0000 | 0.0000 |
| PFS | 0.0000 | 0.0093 | 0.0047 | −0.0046 | −0.0093 |

As shown in TABLE 10, the spherical aberration is corrected at the standard refractive index of 1.54082. While the variation of the refractive index n causes the shift of the paraxial focal point, the spherical aberration can be kept small.

Fourth Embodiment

Figure 7:
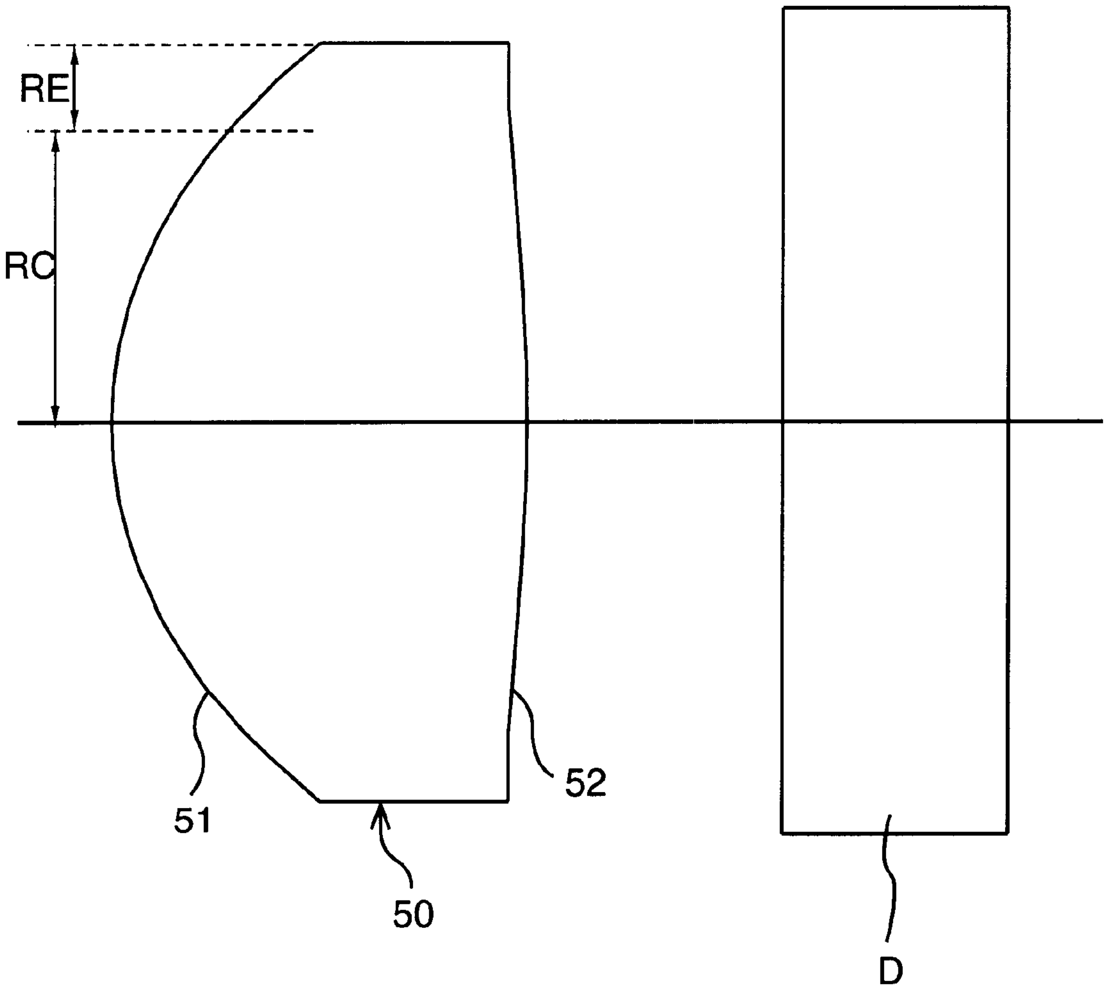
FIG. 7 is a lens diagram showing a refractive-diffractive hybrid lens of a fourth embodiment with an optical disc.

FIG. 7 shows a refractive-diffractive hybrid lens 50 of the fourth embodiment. The refractive-diffractive hybrid lens 50 is an objective lens of a compatible optical disc apparatus that is capable of being used both for a thin cover type optical disc having 0.6 mm thickness cover layer such as a DVD (Digital Versatile Disc) and for a thick cover type optical disc having 1.2 mm thickness cover layer such as a CD (Compact Disc) or a CD-R (CD-Recordable).

The lens surface of the lens 50 is divided into a high NA exclusive area RE through which a laser beam of a high NA, which is necessary for an optical disc having a high recording density such as a DVD only, passes, and a common area RC through which a laser beam of a low NA, which is necessary and sufficient for an optical disc having a low recording density such as a CD or a CD-R, passes. In this embodiment, the common area RC satisfies $0 \leqq h \leqq 1.69$ and the high NA exclusive area RE satisfies $1.69 \leqq h$.

The optical disc apparatus is provided with a first laser source whose emission wavelength is 657 nm for the thin cover type optical disc having a high recording density such as a DVD and a second laser source whose emission wavelength is 790 nm for the thick cover type optical disc having a low recording density such as a CD or a CD-R.

The lens 50 converges a laser beam of 657 nm onto an information layer of thin cover layer optical disc and converges a laser beam of 790 nm onto an information layer of the thick cover layer optical disc.

The refractive-diffractive hybrid lens 50 of the fourth embodiment has a first surface 51 and a second surface 52. The diffractive lens structure is formed in both of the common area RC and the high NA exclusive area RE of the first surface 51. The diffractive lens structure formed within the common area RC is defined by the different optical path difference function from that for the high NA exclusive area RE. Additionally, the base curve of the common area RC is an aspherical surface that is different from the aspherical base curve of the high NA exclusive area. The second surface is a continuous aspherical surface without steps.

The diffractive lens structure formed within the common area RC of the refractive-diffractive hybrid lens 50 has such a wavelength dependence that a first-order diffracted beam forms an appropriate wavefront for the thin cover type optical disc at a wavelength of 657 nm, and forms an appropriate wavefront for the thick cover type optical disc at a wavelength of 790 nm. More specifically, the diffractive lens structure within the common area RC has such a wavelength dependence that spherical aberration varies in the undercorrected direction as wavelength of incident beam increases.

The spherical aberration changes in the overcorrected direction as the thickness of the cover layer increases. Further, the diffractive lens structure changes the spherical aberration in the undercorrected direction as the wavelength of the incident laser beam increases. And thus, since a longer wavelength laser beam is used for the thick cover type optical disc, and a shorter wavelength light beam is used for the thin cover type optical disc, the change of the spherical aberration due to change of the cover layer's thickness is counterbalanced by the change of the spherical aberration due to the wavelength dependence of the diffractive lens structure. Further, the above design also reduces the change of the relative spherical aberration due to the variation of the refractive index.

With respect to the wavelength dependence of the spherical aberration, the diffractive lens structure formed within the high NA exclusive area RE is smaller than that in the common area RC. Further, the diffractive lens structure formed within the high NA exclusive area RE is designed such that the spherical aberration for the thin cover type optical disc at the wavelength of 657 nm is adequately corrected.

With this construction, when the thin cover type optical disc is used, the laser beam at the wavelength of 657 nm passing through both of the common area RC and the high NA exclusive area RE is converged onto the information layer of the thin cover type optical disc because the diffractive lens structures of both of the areas RC and RE adequately correct spherical aberration. Since the effective NA is high and the wavelength is short, the small beam spot, which is suitable for the thin cover type optical disc having high recording density, is formed.

On the other hand, when the thick cover type optical disc is used, while the laser beam at the wavelength of 790 nm passing through the common area RC is converged onto the information layer of the thick cover type optical disc because the diffractive lens structure in the area RC corrects the spherical aberration, the laser beam of 790 nm passing through the high NA exclusive area RE is diffused over a doughnut-shaped area around the beam spot because the diffractive lens structure in the area RE does not correct spherical aberration adequately at 790 nm. Since the effective NA is low and the wavelength is long, the large beam spot, which is suitable for the thick cover type optical disc having low recording density, is formed.

The numerical constructions of the fourth embodiment are described in TABLE 11. TABLE 11 shows the various coefficients that define the base curve and the diffractive lens structure of the common area RC of the first surface 51, the various coefficients that define the base curve and the diffractive lens structure of the high NA exclusive area RE of the first surface 51, the various coefficients that define the second surface 52, distance between the surfaces, refractive indices at the working wavelengths. In TABLE 11, $NA_1$, $f_1$ and $\lambda_1$ denote a numerical aperture, a focal length (unit:mm) and a working wavelength (unit:nm) for the thin cover type optical disc, $NA_2$, $f_2$ and $\lambda_2$ denote a numerical aperture, a focal length (unit:mm) and a working wavelength for the thick cover type optical disc, respectively.

TABLE 11

$NA_1 = 0.60$ $f_1 = 3.360$ $\lambda_1 = 657$ nm
$NA_2 = 0.50$ $f_2 = 3.384$ $\lambda_2 = 790$ nm

| | First surface | | |
|---|---|---|---|
| | Common area (0 ≦ h < 1.69) | High-NA exclusive area (1.69 ≦ h) | Second surface |
| r | 2.101 | 2.129 | −8.450 |
| κ | −0.500 | −0.500 | 0.0 |
| A4 | $-1.81100 \times 10^{-3}$ | $-6.72000 \times 10^{-4}$ | $1.60200 \times 10^{-2}$ |
| A6 | $-2.44900 \times 10^{-4}$ | $-1.46200 \times 10^{-5}$ | $-3.26800 \times 10^{-3}$ |
| A8 | $-1.75000 \times 10^{-5}$ | $-8.69200 \times 10^{-5}$ | $1.29900 \times 10^{-4}$ |
| A10 | $-3.51400 \times 10^{-6}$ | $2.19000 \times 10^{-5}$ | $3.20300 \times 10^{-5}$ |
| A12 | $-2.56000 \times 10^{-6}$ | $-5.36100 \times 10^{-6}$ | $-3.74500 \times 10^{-6}$ |
| P2 | 0.0 | −2.56044 | — |
| P4 | −1.65300 | −0.80000 | — |
| P6 | −0.15050 | −0.09000 | — |
| P8 | 0.0 | 0.0 | — |
| P10 | 0.0 | 0.0 | — |
| P12 | 0.0 | 0.0 | |

TABLE 11-continued $NA_1 = 0.60$ $f_1 = 3.360$ $\lambda_1 = 657$ nm
$NA_2 = 0.50$ $f_2 = 3.384$ $\lambda_2 = 790$ nm

| | First surface | | |
|---|---|---|---|
| | Common area (0 ≦ h < 1.69) | High-NA exclusive area (1.69 ≦ h) | Second surface |
| $h_{max}$ | 1.6800 | 2.2000 | |
| m | 1 | 1 | — |
| d | | 2.210 | |
| n657 | | 1.54059 | |
| n790 | | 1.53653 | |

In the fourth embodiment, a value of the intermediate term of the condition (1) is found as follows:

$$P_4 \times m \times \lambda \times (h_{max}/NA)^3 = -1.653 \times 1 \times 0.000790 \times (1.68/0.50)^3 = -0.04954$$

Therefore, the fourth embodiment satisfies the condition (1).

TABLE 12 shows the change of the spherical aberration and the paraxial focal point shift due to the variation of the refractive index when the lens 50 of the fourth embodiment works with the thick cover type optical disc.

TABLE 12

| hi | n = 1.53653 | n = 1.53453 | n = 1.53553 | n = 1.54753 | n = 1.54853 |
|---|---|---|---|---|---|
| 1.6800 | 0.0001 | 0.0001 | 0.0001 | 0.0002 | 0.0002 |
| 1.5120 | −0.0001 | −0.0001 | −0.0001 | −0.0001 | 0.0000 |
| 1.3440 | −0.0001 | −0.0001 | −0.0001 | −0.0001 | −0.0001 |
| 1.1760 | 0.0000 | 0.0000 | 0.0000 | 0.0000 | 0.0000 |
| 1.0080 | 0.0000 | 0.0001 | 0.0000 | 0.0000 | 0.0001 |
| 0.8400 | 0.0000 | 0.0001 | 0.0000 | 0.0000 | 0.0001 |
| 0.6720 | 0.0000 | 0.0000 | 0.0000 | 0.0000 | 0.0000 |
| 0.5040 | 0.0000 | 0.0000 | 0.0000 | 0.0000 | 0.0000 |
| 0.3360 | 0.0000 | 0.0000 | 0.0000 | 0.0000 | 0.0000 |
| 0.1680 | 0.0000 | 0.0000 | 0.0000 | 0.0000 | 0.0000 |
| 0.0000 | 0.0000 | 0.0000 | 0.0000 | 0.0000 | 0.0000 |
| PFS | 0.0000 | 0.0106 | 0.0053 | −0.0053 | −0.0106 |

As shown in TABLE 12, the spherical aberration is corrected at the standard refractive index of 1.53653. While the variation of the refractive index n causes the shift of the paraxial focal point, the spherical aberration can be kept small.

As described above, according to the invention, the variation of the spherical aberration due to the change of the refractive index can be reduced. Therefore, when the lens is made from resin, the degradation of the performance can be reduced even if the refractive index varies due to temperature change. Further, the spherical aberration of a glass mold lens or a plastic mold lens can be adequately corrected even if the refractive index of material is not stable during a molding process because of physical properties of the material or molding conditions.

Still further, when the lens of the invention is applied to a plastic objective lens that works at two different wavelengths for optical discs whose cover layers are different in thickness, the variation of the spherical aberration due to change of refractive index should be reduced at one working wavelength. Additionally, when the lens is molded under the condition where the optical performance at the other working wavelength is optimized, the spherical aberration can be reduced at both of working wavelength even if chromatic dispersion (i.e., Abbe number) of the lens is different from a design value.

The present disclosure relates to the subject matter contained in Japanese Patent Application No. HEI 11-375019, filed on Dec. 28, 1999, which is expressly incorporated herein by reference in its entirety.

What is claimed is:

1. A refractive-diffractive hybrid lens, comprising:

a refractive lens; and a diffractive lens structure having a plurality of concentric ring-shaped steps that are formed on at least one lens surface of said refractive lens, wherein said refractive lens comprises a single lens whose at least one surface is an aspherical surface, and said refractive lens is designed such that a change of spherical aberration due to the variation of the refractive index is reduced;

wherein said diffractive lens structure generates a negative spherical aberration and is designed to correct residual spherical aberration; and wherein the following condition (1) is satisfied:

$$-0.20<P_4\times m\times\lambda\times(h_{MAX}/NA)^3<-0.04 \quad (1)$$

where NA is a numerical aperture, $h_{MAX}$ is a height from the optical axis of a point where the light ray defining said NA intersects said diffractive lens structure, m is diffraction order, λ is wavelength, and $P_4$ is a fourth order coefficient when an additional optical path length added by said diffractive lens structure is expressed by the following optical path difference function Φ(h):

$$\Phi(h)=(P_2h^2+P_4h^4+P_6h^6+\ldots)\times m\times\lambda$$

where $P_2$ and $P_6$ are coefficients of second and sixth orders, h is a height from the optical axis.

2. A refractive-diffractive hybrid lens, comprising:

a refractive lens; and a diffractive lens structure having a plurality of concentric ring-shaped steps that are formed on at least one lens surface of said refractive lens, wherein said refractive lens and said diffractive lens structure are designed such that a change of spherical aberration due to the variation of the refractive index is reduced;

wherein said refractive lens comprises a single lens whose at least one surface is an aspherical surface;

wherein said diffractive lens structure generates a negative spherical aberration; and wherein the following condition (1) is satisfied;

$$-0.20<P_4\times m\times\lambda\times(h_{MAX}/NA)^3<-0.04 \quad (1)$$

where NA is a numerical aperture, $h_{MAX}$ is a height from the optical axis of a point where the light ray defining said NA intersects said diffractive lens structure, m is diffraction order, λ is wavelength, and $P_4$ is a fourth order coefficient when an additional optical path length added by said diffractive lens structure is expressed by the following optical path difference function Φ(h):

$$\Phi(h)=(P_2h^2+P_4h^4+P_6h^6+\ldots)\times m\times\lambda$$

where $P_2$ and $P_6$ are coefficients of second and sixth orders, and h is a height from the optical axis.

* * * * *